March 5, 1946. J. W. SWENSON 2,395,978
TOOL FOR CUTTING ASBESTOS-CEMENT BOARD OR THE LIKE
Filed Oct. 30, 1943
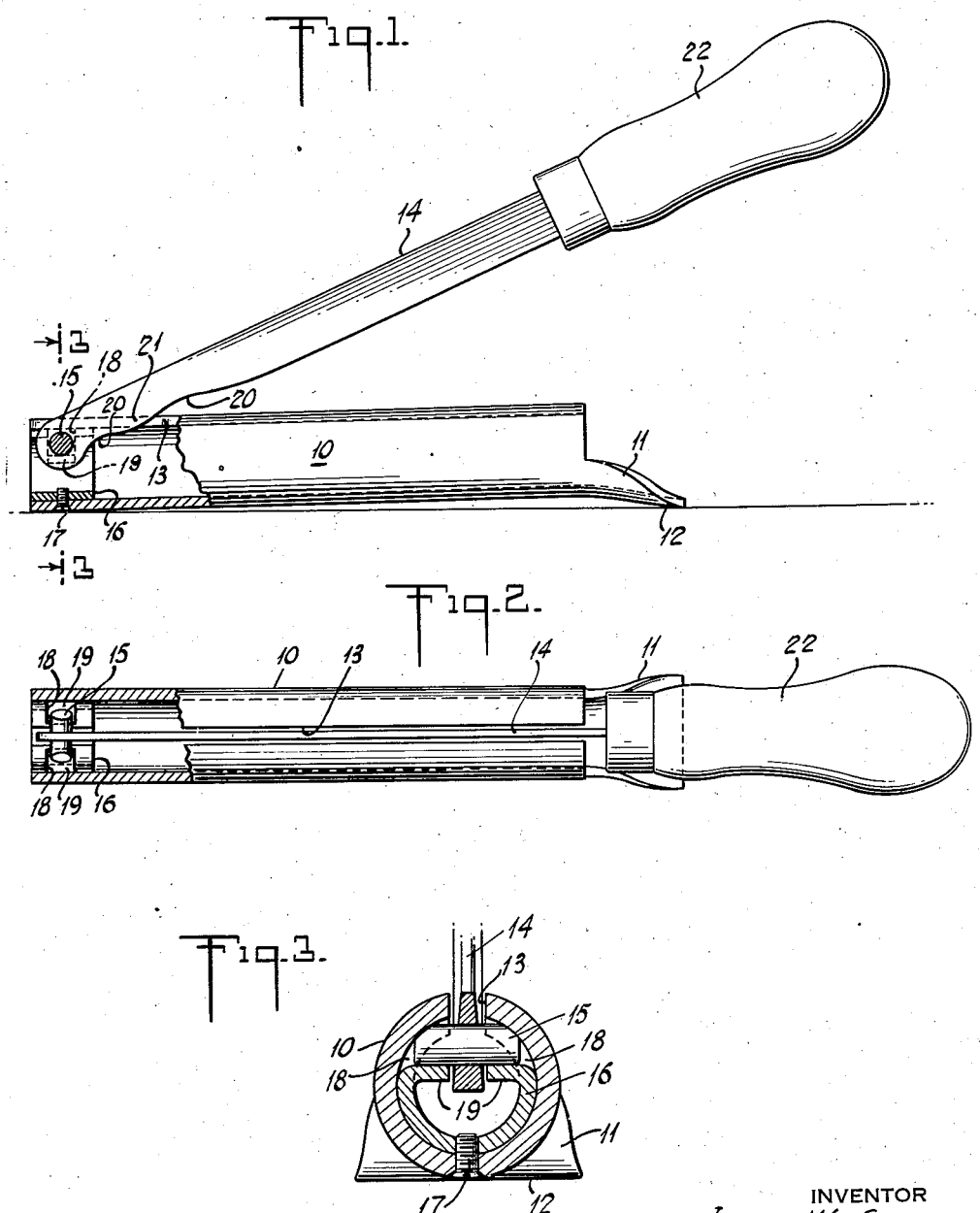
INVENTOR
JOSEPH W. SWENSON
BY
ATTORNEY Patented Mar. 5, 1946

2,395,978

UNITED STATES PATENT OFFICE 2,395,978

TOOL FOR CUTTING ASBESTOS-CEMENT BOARD OR THE LIKE

Joseph W. Swenson, Summit, N. J., assignor to The Ruberoid Co., New York, N. Y., a corporation of New Jersey Application October 30, 1943, Serial No. 508,438

1 Claim. (Cl. 125—23)

This invention relates to a tool for cutting asbestos-cement board and the like.

An object of the invention is to provide a simple, compact, and inexpensive tool for cutting building or construction boards made of asbestos-cement or other hard, stone-like composition.

Another object is to provide a tool that can be used to make right angle or other angular cuts, as well as to make straight or curved cuts. In the use of building boards irregular, angular, or curved cuts are sometimes required to fit the boards around openings for doors, windows, flues, chimneys, etc.

A further object is to provide a tool that operates to cut the board in a succession of cuts of relatively short length and that is free to move or slide bodily between successive cuts so that the operator can control the direction and length of the cut at will.

A still further object is to provide a tool having a convexly curved cutting edge that is thickest at its lowest point and gradually decreases in thickness toward the top so that in making each cut the cutting edge may freely enter into the cut previously made.

Heretofore asbestos-cement boards have generally been cut either by sawing, or by first scoring the board and then breaking it along the scored line. It has been found that in sawing the board the saw teeth soon become dull. Scoring and breaking is objectionable since the board does not always break with a clean fracture.

The tool of the present invention will cut asbestos-cement or other hard boards easily, and with a smooth, clean, square edge. Furthermore, the waste produced in cutting drops into and is caught in the hollow case of the tool from which it may be emptied as required.

The tool, with its handle in closed position, is very compact and may be conveniently carried by the operator in his pocket. The tool is small and light enough that it may be carried in the rule pocket of a pair of overalls.

One embodiment of the invention is illustrated in the accompanying drawing, in which:

Figure 1 is a side view of the tool with its blade in partly raised position, the front end of the tool being shown in section;

Fig. 2 is a plan view, partly in section, of the tool showing the blade in completely closed position; and, Fig. 3 is a vertical section taken on the line 3—3 of Fig. 1.

The tool comprises a hollow case 10 of any suitable shape, preferably tubular, having a flange 11 at one end formed with a flat lower surface 12 on which the tool rests so that it can freely move or slide on a horizontal support. Other means than the flange 11 may be provided to serve as a rest for the tool. A horizontal slot 13 is formed through and along the top of the case extending the whole or for a part of its length.

A blade 14 is pivotally secured at 15 to the case. While the blade may be pivoted directly to the case, I prefer, for ease of assembly, detachment and replacement, to pivot it to a separate collar 16 which is inserted into the end of the case and is detachably secured thereto by means of a screw 17 or other suitable fastener. The collar may be provided with two diametrically opposed slots 18 that receive and form a bearing for the ends of the pivot 15. The pivot rests on, and the blade is disposed between the two flanges or members 19 formed at the bottom of the slots by bending down the portions of material cut out from the slots. When the collar is inserted in and attached to the case the pivot will be held in place, as shown in Fig. 3.

The lower edge of the blade, adjacent the pivot 15, is preferably formed as shown with concave portions 20 and a convex portion 21, which latter portion constitutes the cutting edge proper. The cutting edge 21 is blunt and is thickest at its lowest point, usually about $\frac{1}{8}''$ thick, its thickness gradually decreasing towards the portions 20 and the upper edge of the blade. The blade may be provided with a handle 22. The portion of the blade between the handle and the cutting edge serves merely as a lever.

In using the tool, the blade is raised to an upright position and the board to be cut is laid on the case 10 over slot 13 and under cutting edge 21. The blade is then depressed to make a relatively short cut in the board after which it is again raised and the tool is moved into position for the succeeding cut. Since the edge of portion 20 is somewhat thinner than the maximum thickness of the cutting edge 21, when the blade is in raised position it will enter freely into the cut previously made. The cutting operation is performed in a succession of strokes, that is with a nibbling action rather than with a single long cut, the tool being moved bodily between successive strokes. Because of the curvature of the cutting edge, and the fact that the tool as a whole is freely movable, the operator is able readily to make curved, angular, or straight cuts, or to follow a guide line of any direction and length.

While I have herein illustrated and described a preferred embodiment of the tool it will be understood that variations in the form and details of construction thereof may be made within the scope of the claim.

What I claim is:

A tool of the character described comprising a freely movable hollow case, a collar detachably fastened in one end of the case, said collar having two diametrically opposed notches for receiving the ends of a pivot pin, a pivot pin removably supported in said notches and retained therein by abutment of the ends of the pin against the case, a blade mounted on the pivot pin and a slot through the top of the case for reception of the blade.

JOSEPH W. SWENSON.